(12) United States Patent
Nakamura et al.

(10) Patent No.: US 11,600,406 B2
(45) Date of Patent: Mar. 7, 2023

(54) WIRE HARNESS WITH A REFERENCE MARK FOR AN ATTACHMENT ORIENTATION

(71) Applicant: Sumitomo Wiring Systems, Ltd., Yokkaichi (JP)

(72) Inventors: Yoshinori Nakamura, Yokkaichi (JP); Kyungwoo Kim, Yokkaichi (JP); Toshinari Kobayashi, Yokkaichi (JP); Futa Asano, Yokkaichi (JP); Yukitoshi Terasaka, Yokkaichi (JP); Takaki Iwashita, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 17/482,654

(22) Filed: Sep. 23, 2021

(65) Prior Publication Data
US 2022/0093289 A1 Mar. 24, 2022

(30) Foreign Application Priority Data

Sep. 24, 2020 (JP) .............................. JP2020-159774

(51) Int. Cl.
*H01B 7/36* (2006.01)
*H01B 7/40* (2006.01)
*H01B 7/00* (2006.01)
*B60R 16/02* (2006.01)

(52) U.S. Cl.
CPC .......... *H01B 7/361* (2013.01); *H01B 7/0045* (2013.01); *H01B 7/40* (2013.01); *B60R 16/0207* (2013.01)

(58) Field of Classification Search
CPC ........ H01B 7/361; H01B 7/0045; H01B 7/40; B60R 16/0215
USPC ........................................................ 174/72 A
See application file for complete search history.

(56) References Cited

U.S. PATENT DOCUMENTS

| | | | | |
|---|---|---|---|---|
| 9,776,581 | B2* | 10/2017 | Oga | .................... B60R 16/0215 |
| 10,576,915 | B2 | 3/2020 | Shimizu et al. | |
| 10,821,919 | B2 | 11/2020 | Shimizu et al. | |
| 2006/0070766 | A1* | 4/2006 | Katsumata | ............. H01B 13/34 |
| | | | | 174/112 |
| 2015/0136482 | A1* | 5/2015 | Adachi | ................ H02G 3/0468 |
| | | | | 174/72 A |
| 2015/0179308 | A1* | 6/2015 | Inao | ........................ H02G 3/02 |
| | | | | 307/10.1 |

(Continued)

*Primary Examiner* — Timothy J Thompson
*Assistant Examiner* — Michael F McAllister
(74) *Attorney, Agent, or Firm* — Honigman LLP

(57) ABSTRACT

An object of the present disclosure is to provide a technique that can prevent, in a wire harness including a fixing member, the fixing member from being attached in a deviated orientation. A wire harness includes: a wiring member; a fixing member provided on the wiring member; and a first reference mark and a second reference mark that are each provided at a position of the wiring member that corresponds to the fixing member. The first reference mark and the second reference mark each have a distinctive external appearance in a circumferential direction of the wiring member. The first reference mark indicates a reference position of the wiring member in the circumferential direction, and the second reference mark indicates a position of the wiring member in the circumferential direction, the position serving as a reference for an attachment orientation of the fixing member.

13 Claims, 8 Drawing Sheets

(56) References Cited

U.S. PATENT DOCUMENTS

2019/0176721 A1\* 6/2019 Fan ..................... H01B 7/36
2021/0009052 A1   1/2021 Shimizu et al.
2021/0009053 A1   1/2021 Shimizu et al.

\* cited by examiner

WIRE HARNESS WITH A REFERENCE MARK FOR AN ATTACHMENT ORIENTATION

CROSS-REFERENCE TO RELATED APPLICATIONS

This application claims priority of Japanese Patent Application No. JP 2020-159774 filed on Sep. 24, 2020, the contents of which are incorporated herein.

TECHNICAL FIELD

The present disclosure relates to a wire harness.

BACKGROUND

JP 2016-91731A discloses a harness in which a waterproof portion that waterproofs an end portion of a sheath, and a bracket attachment portion to which a bracket is to be attached are molded in one piece at a branching portion of two cables.

SUMMARY

As in the case of the harness described in JP 2016-91731A, a wire harness may be mounted to a target such as a vehicle by fixing a fixing member, such as a bracket, to a fixing counterpart. The orientation of the fixing member attached to the wire harness may be set in advance such that the wire harness can take a predetermined posture in a state in which the fixing member is fixed to the fixing counterpart. In this case, if there is a large deviation in the orientation of the fixing member, there may also be a large deviation in the posture of the wire harness in a state in which the fixing member is fixed to the fixing counterpart.

Therefore, an object of the present disclosure is to provide a technique that can prevent, in a wire harness including a fixing member, the fixing member from being attached in a deviated orientation.

A wire harness according to an aspect of the present disclosure is a wire harness including: a wiring member; a fixing member provided on the wiring member; and a first reference mark and a second reference mark that are each provided at a position of the wiring member that corresponds to the fixing member, wherein the first reference mark and the second reference mark each have a distinctive external appearance in a circumferential direction of the wiring member, the first reference mark indicates a reference position of the wiring member in the circumferential direction, and the second reference mark indicates a position of the wiring member in the circumferential direction, the position serving as a reference for an attachment orientation of the fixing member.

According to the present disclosure, it is possible to prevent, in a wire harness including a fixing member, the fixing member from being attached in a deviated orientation.

DETAILED DESCRIPTION OF PREFERRED EMBODIMENTS

Figure 1:
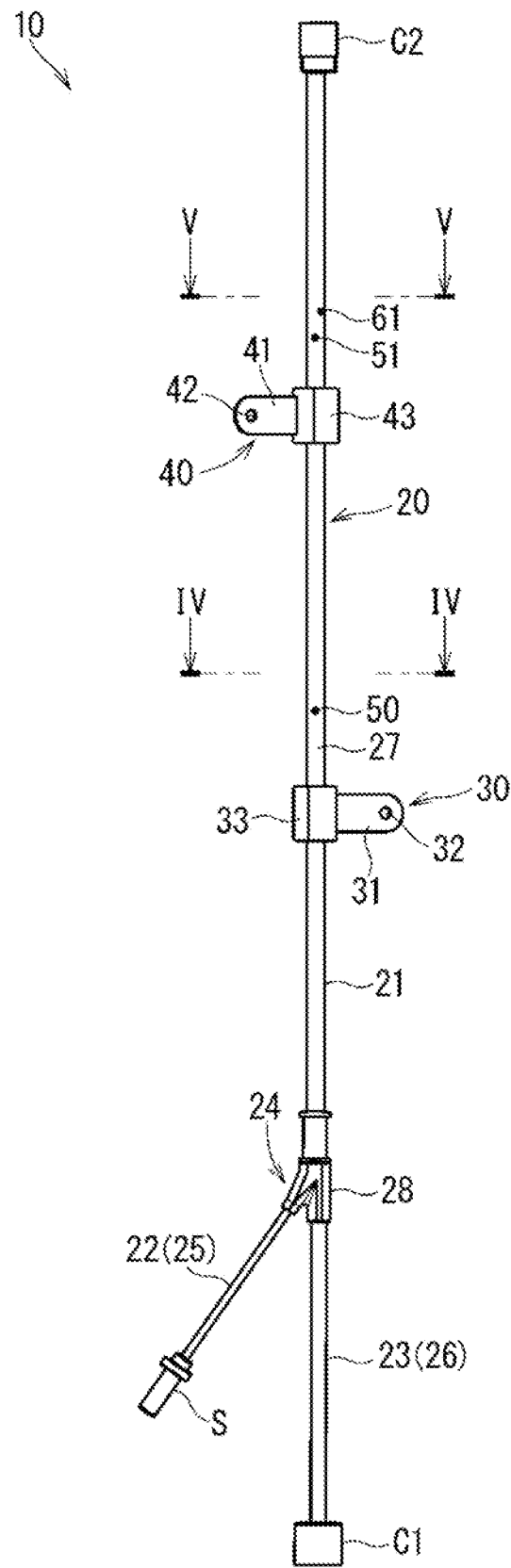
FIG. 1 is a plan view showing a wire harness according to Embodiment 1.

First, aspects of the present disclosure will be listed and described.

The wire harness according to the present disclosure is as follows.

In a first aspect, a wire harness includes: a wiring member; a fixing member provided on the wiring member; and a first reference mark and a second reference mark that are each provided at a position of the wiring member that corresponds to the fixing member, wherein the first reference mark and the second reference mark each have a distinctive external appearance in a circumferential direction of the wiring member, the first reference mark indicates a reference position of the wiring member in the circumferential direction, and the second reference mark indicates a position of the wiring member in the circumferential direction, the position serving as a reference for an attachment orientation of the fixing member. Providing the first reference mark allows the reference orientation of the wiring member in the circumferential direction to be easily recognized also at the attachment position of the fixing member. With this configuration, the second reference mark can be easily provided at an appropriate position of the wiring member in the circumferential direction, and the fixing member can be attached with reference to the first reference mark and the second reference mark, thus allowing the fixing member to be easily attached in an appropriate orientation relative to the wiring member.

In a second aspect, the wire harness according to the first aspect, at least one of the first reference mark and the second reference mark may also have a distinctive external appearance in a longitudinal direction of the wiring member. With this configuration, the first reference mark and the second reference mark can also indicate, in addition to the position of the wiring member in the circumferential direction, the position of the wiring member in the longitudinal direction, and the fixing member can be easily attached to an appropriate position along the longitudinal direction of the wiring member.

In a third aspect, the wire harness according to the first aspect or the second aspect, the fixing members may be provided at a plurality of positions spaced apart along a longitudinal direction of the wiring member, and both the first reference mark and the second reference mark may be provided at positions respectively corresponding to the plurality of the fixing members. With this configuration, even when a plurality of fixing members are provided, the fixing members can be easily attached in appropriate orientations.

In a fourth aspect, the wire harness according to the third aspect, the plurality of the first reference marks may be provided at positions in the same phase along the circumferential direction of the wiring member. With this configuration, the orientation of the wiring member as viewed from one direction can be easily aligned.

In a fifth aspect, the wire harness according to the fourth aspect, a reference line mark extending along the longitudinal direction of the wiring member may be provided on the wiring member at a position in the same phase as the plurality of the first reference marks. With this configuration, the degree of twisting of the wiring member can be checked by checking the degree of bending of the reference line mark when the wire harness is mounted to a vehicle. In addition, usage of the first reference mark enables the reference line mark to be easily provided.

In a sixth aspect, the wire harness according to any one of the third through the fifth aspect, the plurality of the fixing members may be attached in the same orientation relative to the respective corresponding second reference marks. With this configuration, the fixing members can be easily attached in appropriate orientations.

In a seventh aspect, the wire harness according to any one of the first through the sixth aspect, a reference plane may be set on the wiring member, and the first reference mark may be provided at a position that is based on the reference plane. With this configuration, the first reference mark can be easily set.

In an eighth aspect, the wire harness according to the seventh aspect, the wiring member may include a branching portion that branches into two branch line portions from an end portion of a main line portion, and a plane including an extension direction of the main line portion and extension directions of the two branch line portions at the branching portion may be set as the reference plane. With this configuration, the reference plane can be easily set.

In a ninth aspect, the wire harness according to the seventh aspect, the wire harness may further include a clip fixed to the wiring member, wherein the clip may be formed so as to be able to be inserted into and locked to a hole formed in an attachment target, and a plane orthogonal to an insertion direction of the clip may be set as the reference plane. With this configuration, the reference plane can be easily set.

In a tenth aspect, the wire harness according to the seventh aspect, the wiring member may include a bent path restriction portion restricted so as to form a path that is planarly bent from a first direction toward a second direction, and a plane including the first direction and the second direction may be set as the reference plane. With this configuration, the reference plane can be easily set.

In an eleventh aspect, the wire harness according to any one of the seventh aspect to the tenth aspect, the first reference mark may be provided at a position of an intersection point between a plane passing through a center of the wiring member and parallel or orthogonal to the reference plane, and an outer surface of the wiring member. With this configuration, the first reference mark can be easily set using the reference plane SP.

In a twelfth aspect, the wire harness according to any one of the first aspect through the eleventh aspect, the first reference mark and the second reference mark may have colors different from each other. With this configuration, the first reference mark and the second reference mark can be easily distinguished from each other.

In a thirteenth aspect, the wire harness according to any one of the first aspect to the twelfth aspect, the wiring member may include a first wire for an ABS sensor, a second wire for an EPB, and a sheath provided around the first wire and the second wire, and the first reference mark and the second reference mark may be provided on an outer surface of the sheath. With this configuration, providing the first reference mark and the second reference mark facilitates phase management even on the outer surface of the sheath where it is difficult to recognize phases.

Specific examples of the wire harness according to the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment 1

Figure 2:
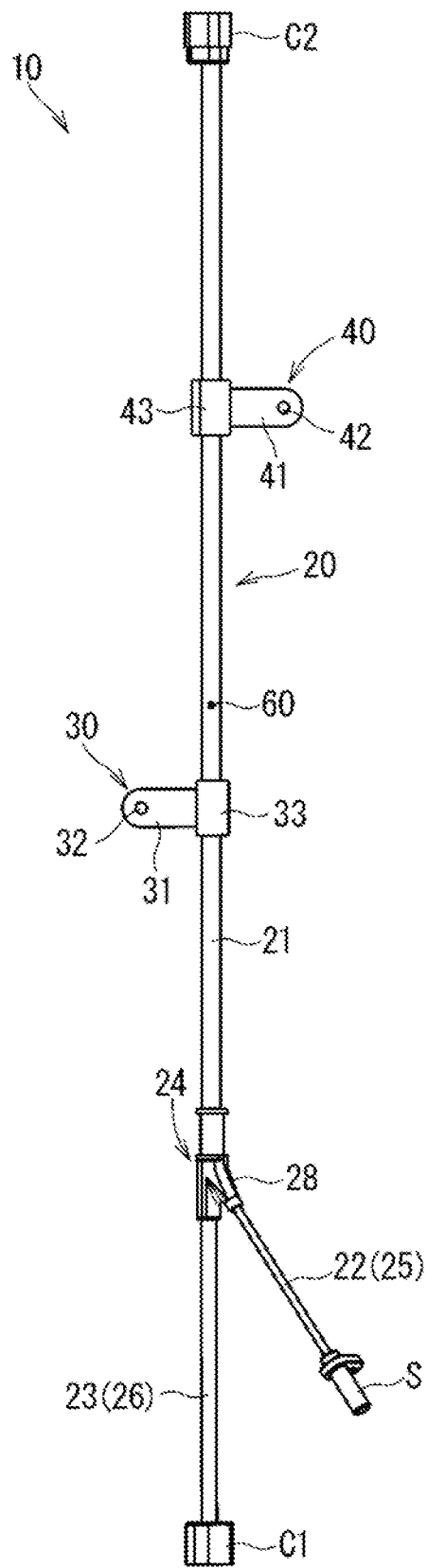
FIG. 2 is a plan view showing the wire harness according to Embodiment 1.
Figure 3:
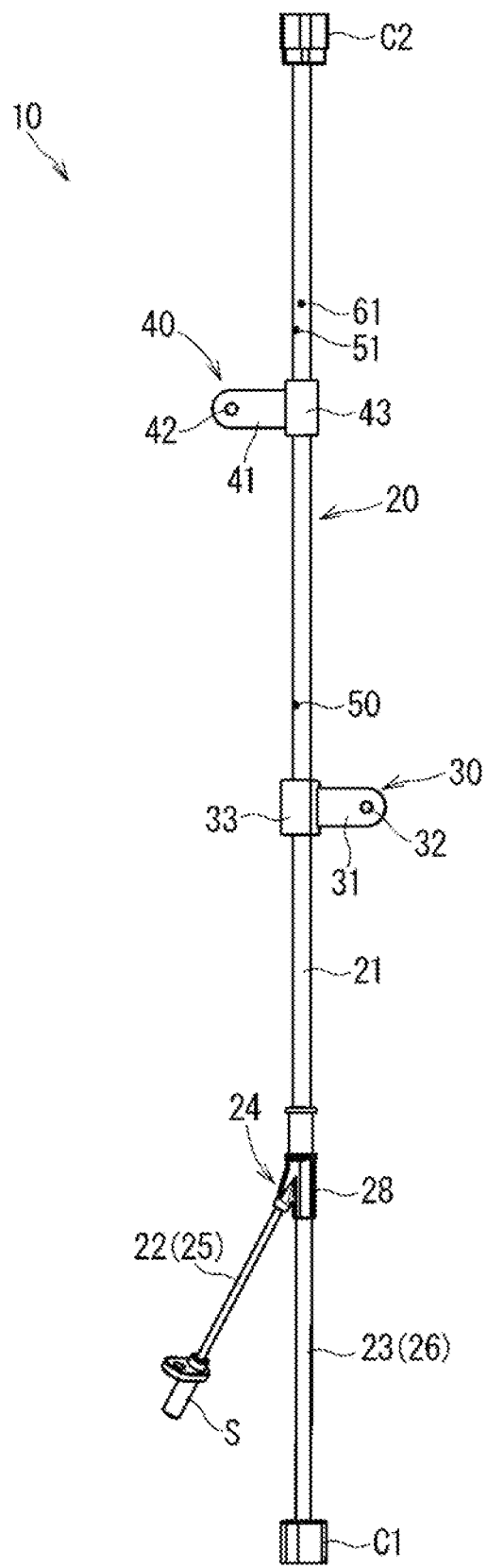
FIG. 3 is a plan view showing the wire harness according to Embodiment 1.
Figure 4:
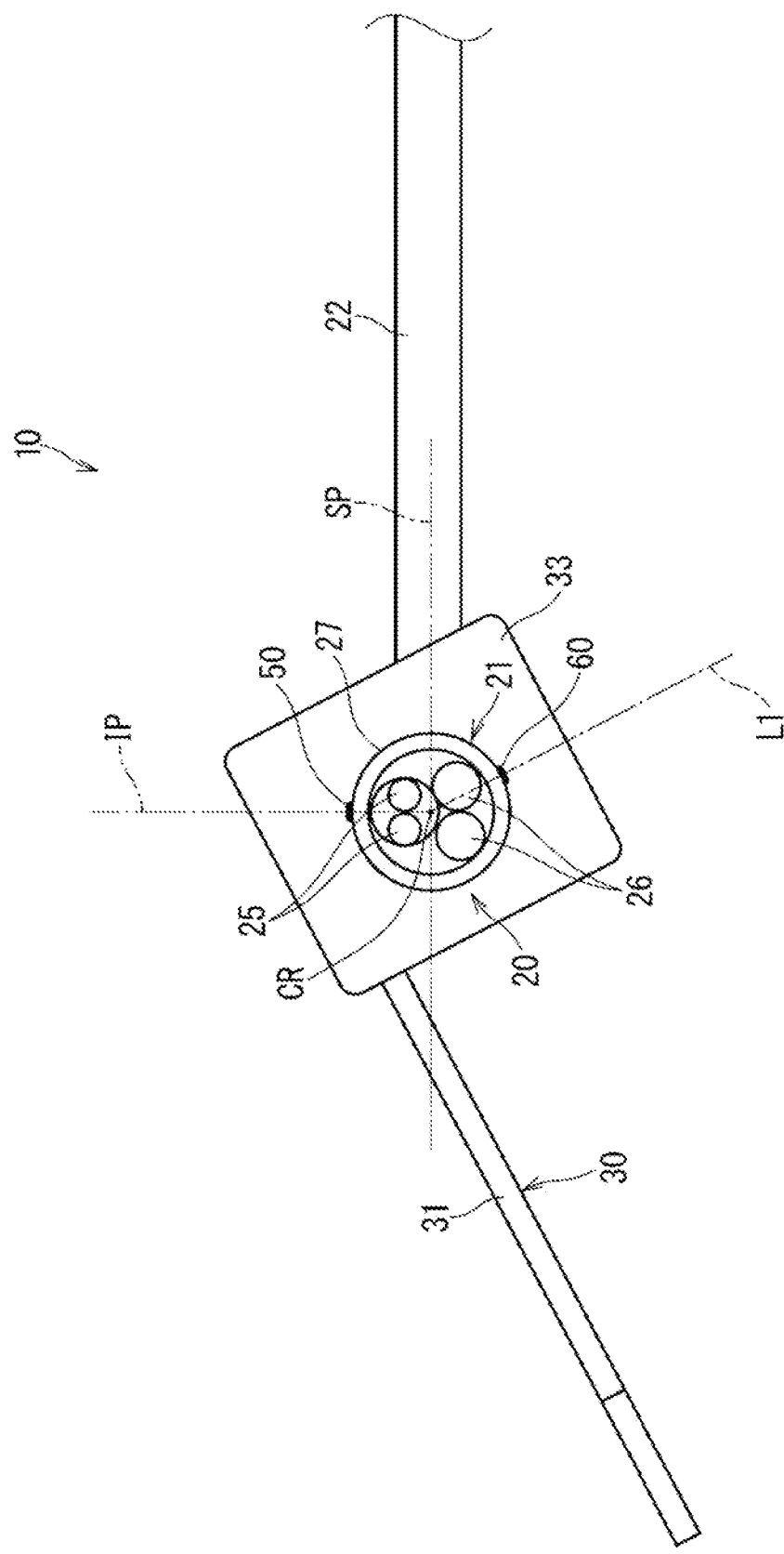
FIG. 4 is a cross-sectional view taken along the line IV-IV in FIG. 1.
Figure 5:
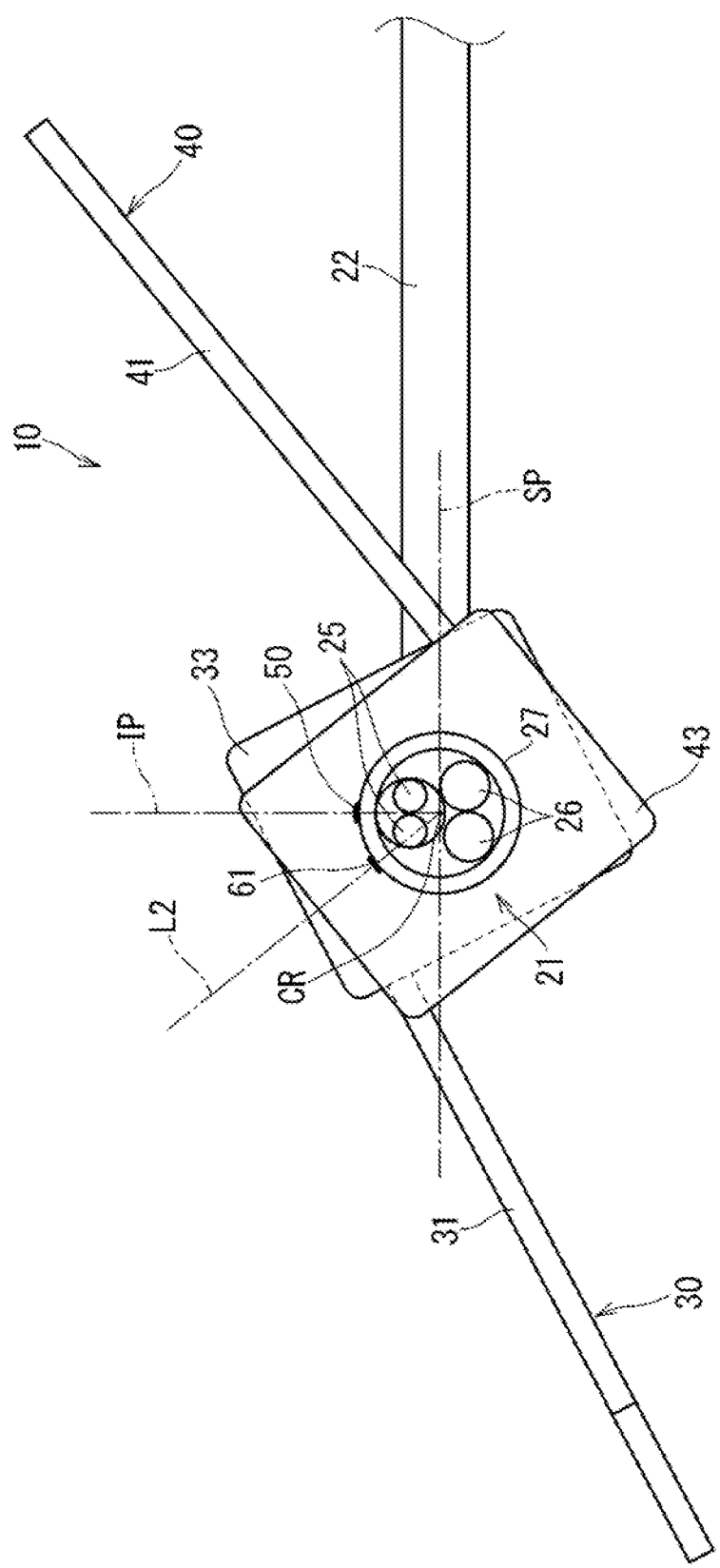
FIG. 5 is a cross-sectional view taken along the line V-V in FIG. 1.

In the following, a wire harness according to Embodiment 1 will be described. FIGS. 1 to 3 are plan views showing a wire harness 10 according to Embodiment 1. FIGS. 1 to 3 are plan views viewed from viewpoints different from each other. FIG. 4 is a cross-sectional view taken along the line IV-IV in FIG. 1. FIG. 5 is a cross-sectional view taken along the line V-V in FIG. 1. Note that the hatching has been omitted in FIGS. 4 and 5.

The wire harness 10 includes a wiring member 20, fixing members 30 and 40, first reference marks 50 and 51, and second reference marks 60 and 61.

The wiring member 20 includes a branching portion 24 that branches into two branch line portions 22 and 23 from an end portion of a main line portion 21. The wiring member 20 includes a first wire 25, a second wire 26, and a sheath 27. The first wire 25 is a wire for an anti-lock brake system (ABS) sensor. The first wire 25 is used as a signal line through which signals from a sensor for detecting wheel speed are transmitted in the ABS. The second wire 26 is a wire for an electric parking brake (EPB). The second wire 26 is used as a power line through which power is supplied to the EPB. The sheath 27 is provided around the first wire 25 and the second wire 26. In the wiring member 20, the portion where the sheath 27 is provided is the main line portion 21. In the main line portion 21, the first wire 25 and the second wire 26 extend parallel to each other. At the branching portion 24, the first wire 25 and the second wire 26 are branched from an end portion of the sheath 27, thus forming branch line portions 22 and 23, respectively. Portions of the first wire 25 and the second wire 26 that extend independently of each other are the branch line portions 22 and 23, respectively.

The branching portion 24 is provided with a branch retaining portion 28. The branch retaining portion 28 is a portion that retains the shape of the branching portion 24. Here, the branch retaining portion 28 is a resin cover portion insert molded using the wiring member 20 as an insert component. The branch retaining portion 28 does not need to be an insert molded article, and may be formed by attaching, to the wiring member 20, a member such as a protector molded separately from the wiring member 20.

A sensor S for detecting wheel speed is provided at a distal end portion (one end portion the first wire 25) of the branch line portion 22. A connector C1 is provided at a distal end portion (one end portion of the second wire 26) of the branch line portion 23. The connector C1 is connected to a connector on the EPB side. A connector C2 is provided at the other end portion of the first wire 25 and the other end portion of the second wire 26. The connector C2 is connected to a device on the vehicle body side.

The fixing members 30 and 40 are provided on the wiring member 20. Here, two fixing members 30 and 40 are provided on the main line portion 21. One fixing member may be provided, or a plurality of fixing members may be provided. The plurality of (here, two) fixing members 30 and 40 are provided at positions spaced apart along the longitudinal direction of the wiring member 20. The fixing members 30 and 40 are attached in predetermined orientations relative to the wiring member 20. Here, the two fixing members 30 and 40 are attached to the wiring member 20 in orientations different from each other. By fixing the fixing members 30 and 40 to the vehicle, the wiring member 20 is disposed in the vehicle in a posture corresponding to the orientations of the fixing members 30 and 40. If the orientations of the fixing members 30 and 40 are deviated, twisting or the like may occur when the wiring member 20 is disposed in the vehicle.

The types of the fixing members 30 and 40 are not particularly limited as long as the fixing members 30 and 40 can be fixed in predetermined orientations, and may be, for example, a bracket, a clamp, a clip, or the like. In the following, the fixing members 30 and 40 will be described as being the brackets 30 and 40. The brackets 30 and 40 are formed by forming through holes 32 and 42 in plate materials 31 and 41. The brackets 30 and 40 are fixed to the vehicle by passing bolts or the like through the through holes 32 and 42.

The configuration for attaching the fixing members 30 and 40 to the wiring member 20 is not particularly limited, and an attachment configuration that corresponds to the fixing members 30 and 40 can be adopted. For example, when the fixing members 30 and 40 are the brackets 30 and 40, the brackets 30 and 40 can be attached to the wiring member 20 by crimping portions of the plate materials 31 and 41 around the wiring member 20, or embedding portions of the plate materials 31 and 41 into resin cover portions 33 and 43. For example, when the fixing members 30 and 40 are clamps, band clamps can be attached to the wiring member 20 by wrapping portions of the band clamps around the wiring member 20, or taping taped clamps together with the wiring member 20. In the example shown in FIG. 1, the brackets 30 and 40 are attached to the wiring member 20 by embedding portions of the plate materials 31 and 41 into the resin cover portions 33 and 43. The resin cover portions 33 and 43 are formed through insert molding performed in a state in which a portion of the wiring member 20 and portions of the plate materials 31 and 41 are housed in a mold as insert components.

Here, when portions of the brackets 30 and 40 are housed in a mold, the brackets 30 and 40 are housed in predetermined orientations relative to the mold. Accordingly, here, the orientations of the brackets 30 and 40 are determined by the orientations in which the plate materials 31 and 41 extend from the resin cover portions 33 and 43. In the two brackets 30 and 40, the orientations in which the plate materials 31 and 41 extend from the resin cover portions 33 and 43 are the same. Since the orientations of the resin cover portions 33 and 43 relative to the wiring member 20 are different, the orientations of the brackets 30 and 40 relative to the wiring member 20 are different.

The first reference marks 50 and 51 and the second reference marks 60 and 61 are provided on the wiring member 20. Here, the first reference marks 50 and 51 and the second reference marks 60 and 61 are provided on an outer surface of the sheath 27. The first reference marks 50 and 51 and the second reference marks 60 and 61 are provided at positions of the wiring member 20 that correspond to the fixing members 30 and 40. Both the first reference marks 50 and 51 and the second reference marks 60 and 61 are provided at positions respectively corresponding to the plurality of fixing members 30 and 40. The first reference mark 50 and the second reference mark 60 are provided at positions corresponding to the fixing member 30, and the first reference mark 51 and the second reference mark 61 are provided at positions corresponding to the fixing member 40.

The first reference marks 50 and 51 each have a distinctive external appearance in the circumferential direction of the wiring member 20. With this configuration, the first reference marks 50 and 51 can indicate a specific position of the wiring member 20 in the circumferential direction. The first reference marks 50 and 51 indicate a reference position of the wiring member 20 in the circumferential direction.

The positions at which the first reference marks 50 and 51 are provided, or in other words, reference positions of the wiring member 20 in the circumferential direction, can be set as appropriate. The first reference marks 50 and 51 may be set using a reference plane SP (see FIG. 4) set on the wiring member 20. For example, when the branching portion 24 is provided on the wiring member 20, the positions at which the first reference marks 50 and 51 are to be provided can be set using the branching portion 24 in the following manner. A plane including the extension direction of the main line portion 21 and the extension directions of the two branch line portions 22 and 23 at the branching portion 24 is used as the reference plane SP. The first reference marks 50 and 51 are provided at a position at which a virtual plane IP passing through a center CR of the wiring member 20 and orthogonal to the reference plane SP, and the outer surface of the wiring member 20 intersect. The first reference marks 50 and 51 may be provided at a position at which a virtual plane passing through the center CR of the wiring member 20 and parallel to the reference plane SP, and the outer surface of the wiring member 20 intersect. FIG. 1 is a diagram as viewed from the normal direction of the reference plane SP. As shown in FIG. 1, the first reference marks 50 and 51 are located at positions of the uppermost portion or the lowermost portion of the wiring member 20 when the wiring member 20 is disposed such that the reference plane SP is horizontal. In this case, it is preferable to provide a surface parallel to the reference plane SP on the branch retaining portion 28. It is preferable that one of the surfaces of the branch retaining portion 28 is parallel to the reference plane SP.

For example, the positions at which the first reference marks 50 and 51 are provided may be set in the following manner, using one of the connectors C1 and C2 provided at end portions of the wiring member 20. A plane including the column direction or the row direction of the connectors C1 and C2 and the longitudinal direction (fitting direction with counterpart connectors C1 and C2) of the connectors C1 and C2 is set as the reference plane. Using this reference plane, the first reference mark can be provided in the same manner as described above. In this case, it is preferable to provide a surface parallel to the reference plane on each of the connectors. One of the surfaces of each of the connectors may is preferably parallel to the reference plane.

For example, when a plurality of fixing members 30 and 40 are provided on the wiring member 20, a plurality of first reference marks 50 and 51 may be provided at positions in the same phase along the circumferential direction of the wiring member 20. In this case, the positions of the plurality of first reference marks 50 and 51 may be used as reference positions of the wiring member 20 in the circumferential direction.

The second reference marks 60 and 61 each have a distinctive external appearance in the circumferential direction of the wiring member 20. With this configuration, the second reference marks 60 and 61 can indicate a specific position of the wiring member 20 in the circumferential direction. The second reference marks 60 and 61 indicate positions of the wiring member 20 in the circumferential direction, the positions serving as a reference for the attachment orientations of the fixing members 30 and 40.

The plurality of fixing members 30 and 40 are attached to the respective corresponding second reference marks 60 and 61 in the same orientation. FIG. 2 is a plan view of the wiring member 20 as observed from above when the second reference mark 60 is located at an upper portion of the wiring member 20, and FIG. 3 is a plan view of the wiring member 20 as observed from above when the second reference mark 61 is located at an upper portion of the wiring member 20. In FIG. 2, the plate material 31 of the bracket 30 extends from the resin cover portion 33, parallel to the paper plane of FIG. 2 and toward one side (the left side in FIG. 2) relative to the wiring member 20. Similarly, in FIG. 3, the plate material 41 of the bracket 40 extends from the resin cover portion 43, parallel to the paper plane of FIG. 3 and toward one side (the left side in FIG. 3) relative to the wiring member 20. When the phases of the plurality of second reference marks 60 and 61 are aligned, the orientations of the plurality of fixing members 30 and 40 are the same. In FIG. 4, a virtual line L1 passing through the center CR of the wiring member 20 and the second reference mark 60, and the direction in which the plate material 31 extends from the resin cover portion 33 are orthogonal to each other. Similarly, in FIG. 5, a virtual line L2 passing through the center CR of the wiring member 20 and the second reference mark 61, and the direction in which the plate material 41 extends from the resin cover portion 43 are orthogonal to each other.

At least either the first reference marks 50 and 51 or the second reference marks 60 and 61 also have a distinctive external appearance in the longitudinal direction of the wiring member 20. Here, both the first reference marks 50 and 51 and the second reference marks 60 and 61 also have a distinctive external appearance in the longitudinal direction of the wiring member 20. For example, the first reference marks 50 and 51 and the second reference marks 60 and 61 are provided in the form of circular or square dots, and thus have a distinctive external appearance in the circumferential direction and the longitudinal direction of the wiring member 20. For example, when the first reference marks 50 and 51 and the second reference marks 60 and 61 are provided in a linear shape extending in the longitudinal direction of the wiring member 20, the first reference marks 50 and 51 and the second reference marks 60 and 61 have a distinctive external appearance in the circumferential direction of the wiring member 20, while having no distinctive external appearance in the longitudinal direction.

The first reference marks 50 and 51 and the second reference marks 60 and 61 are provided, for example, by applying a coating material to the wiring member 20. This coating material may be applied by an operator, or may be applied using an automated machine. The sizes of the first reference marks 50 and 51 and the second reference marks 60 and 61 are not particularly limited, and may be any viewable size. The sizes of the first reference marks 50 and 51 and the second reference marks 60 and 61 are preferably as small as possible in the range of viewable sizes.

The first reference mark 50 and the second reference mark 60 provided at positions corresponding to the fixing member 30 are provided at positions relatively distant from each other in the circumferential direction of the wiring member 20. In this case, the first reference mark 50 and the second reference mark 60 may be provided at the same position, or may be provided spaced apart from each other, in the longitudinal direction of the wiring member 20. The first reference mark 51 and the second reference mark 61 provided at positions corresponding to the fixing member 40 are provided at positions relatively close to each other in the circumferential direction of the wiring member 20. In this case, the first reference mark 51 and the second reference mark 61 are preferably provided spaced apart from each other in the longitudinal direction of the wiring member 20.

The first reference mark 50 and the second reference mark 60 provided at positions corresponding to the fixing member 30 are provided on the connector C2 side relative to the fixing member 30. Similarly, the first reference mark 51 and the second reference mark 61 provided at positions corresponding to the fixing member 40 are provided on the connector C2 side relative to the fixing member 40. Thus, when the first reference marks 50 and 51 and the second reference marks 60 and 61 are provided at positions corresponding to the plurality of fixing members 30 and 40, the first reference marks 50 and 51 and the second reference marks 60 and 61 may be provided on the same side, or may be provided so as to be located on sides opposite to each other, relative to the plurality of fixing members 30 and 40.

The colors of the first reference marks 50 and 51 and the second reference marks 60 and 61 are not particularly limited, and the first reference marks 50 and 51 and the second reference marks 60 and 61 may have the same color, or may have colors different from each other. When the first reference marks 50 and 51 and the second reference marks 60 and 61 have colors different from each other, the first reference marks 50 and 51 and the second reference marks 60 and 61 can be easily distinguished from each other when they are viewed.

Example of Production Method of Wire Harness

For example, the wire harness 10 may be produced in the following manner.

First, the first reference marks 50 and 51 are provided on the wiring member 20 on which the branch retaining portion 28 is provided. Here, a plane including the extension direction of the main line portion 21 and the extension directions of the two branch line portions 22 and 23 at the branching portion 24 is set as the reference plane SP. The wiring member 20 is disposed such that the reference plane SP is horizontal. For example, when the branch retaining portion 28 has a surface extending parallel to the reference plane SP, the wiring member 20 is disposed with that surface being horizontal. In a state in which the wiring member 20 is extended linearly from the branch retaining portion 28 so as not to be twisted, the first reference marks 50 and 51 are provided on an upper surface of the wiring member 20 at predetermined positions along the longitudinal direction. Then, the second reference marks 60 and 61 are provided with reference to the first reference marks 50 and 51, respectively.

In a state in which the second reference mark 60 appears on the upper surface, a portion of the wiring member 20 and a portion of the plate material 31 of the bracket 30 are set in a mold. At this time, one end portion of the plate material 31 of the bracket 30 extends horizontally from the mold, and the other end portion thereof is housed in the mold. Thereafter, a molten resin is poured into the mold, whereby a resin cover portion 33 is formed. The resin cover portion 43 is also formed in the same manner.

In this manner, the brackets 30 and 40 are attached to the wiring member 20 in predetermined orientations, whereby a wire harness 10 is formed.

Preferably, either or both the first reference marks 50 and 51 and the second reference marks 60 and 61 are not covered by the resin cover portions 33 and 43. Preferably, either or both the first reference marks 50 and 51 and the second reference marks 60 and 61 are exposed on the surface of the wiring member 20. This makes it possible to use either or both the first reference marks 50 and 51 and the second reference marks 60 and 61 to examine whether or not the fixing members 30 and 40 are attached in the predetermined orientations. Either or both the first reference marks 50 and 51 and the second reference marks 60 and 61 may be covered by the resin cover portions 33 and 43.

Effects, etc. of Embodiment 1

With the wire harness 10 configured in the above-described manner, providing the first reference marks 50 and 51 allows the reference orientation of the wiring member 20 in the circumferential direction to be easily recognized also at the attachment positions of the fixing members 30 and 40. With this configuration, the second reference marks 60 and 61 can be easily provided at appropriate positions of the wiring member 20 in the circumferential direction, and the fixing members 30 and 40 can be attached with reference to the first reference marks 50 and 51 and the second reference marks 60 and 61, thus allowing the fixing members 30 and 40 to be easily attached in appropriate orientations relative to the wiring member 20.

At least either the first reference marks 50 and 51 or the second reference marks 60 and 61 also have a distinctive external appearance in the longitudinal direction of the wiring member 20. With this configuration, at least either the first reference marks 50 and 51 or the second reference marks 60 and 61 can also indicate, in addition to the position of the wiring member 20 in the circumferential direction, the position of the wiring member 20 in the longitudinal direction, and the fixing members 30 and 40 can be easily attached to appropriate positions along the longitudinal direction of the wiring member 20.

Both the first reference marks 50 and 51 and the second reference marks 60 and 61 are provided at positions respectively corresponding to the plurality of fixing members 30 and 40. With this configuration, even when a plurality of fixing members 30 and 40 are provided, the fixing members 30 and 40 can be easily attached in appropriate orientations.

The plurality of the first reference marks 50 and 51 are provided at positions in the same phase along the circumferential direction of the wiring member 20. With this configuration, the orientation of the wiring member 20 as viewed from one direction can be easily aligned.

The plurality of the fixing members 30 and 40 are attached in the same orientation relative to the respective corresponding second reference marks 60 and 61. With this configuration, the orientations of the fixing members 30 and 40 can be easily set in appropriate orientations.

The reference plane SP is set on the wiring member 20, and the first reference marks 50 and 51 are set based on the reference plane SP. With this configuration, the first reference marks 50 and 51 can be easily set. Here, the wiring member 20 includes the branching portion 24, and a plane including the extension direction of the main line portion 21 and the extension directions of the two branch line portions 22 and 23 at the branching portion 24 is set as the reference plane SP. With this configuration, the reference plane SP can be easily set. The first reference marks 50 and 51 are provided at a position of an intersection point between a plane passing through the center of the wiring member 20 and parallel or orthogonal (here, orthogonal) to the reference plane SP, and the outer surface of the wiring member 20. With this configuration, the first reference marks 50 and 51 can be easily set using the reference plane SP.

The first reference marks 50 and 51 and the second reference marks 60 and 61 are provided on the outer surface of the sheath 27. With this configuration, providing the first reference marks 50 and 51 and the second reference marks 60 and 61 facilitates phase management even on the outer surface of the sheath 27 where it is difficult to recognize phases.

When the first reference marks 50 and 51 and the second reference marks 60 and 61 have colors different from each other, the first reference marks 50 and 51 and the second reference marks 60 and 61 can be easily distinguished from each other when they are viewed.

Modifications

Figure 6:
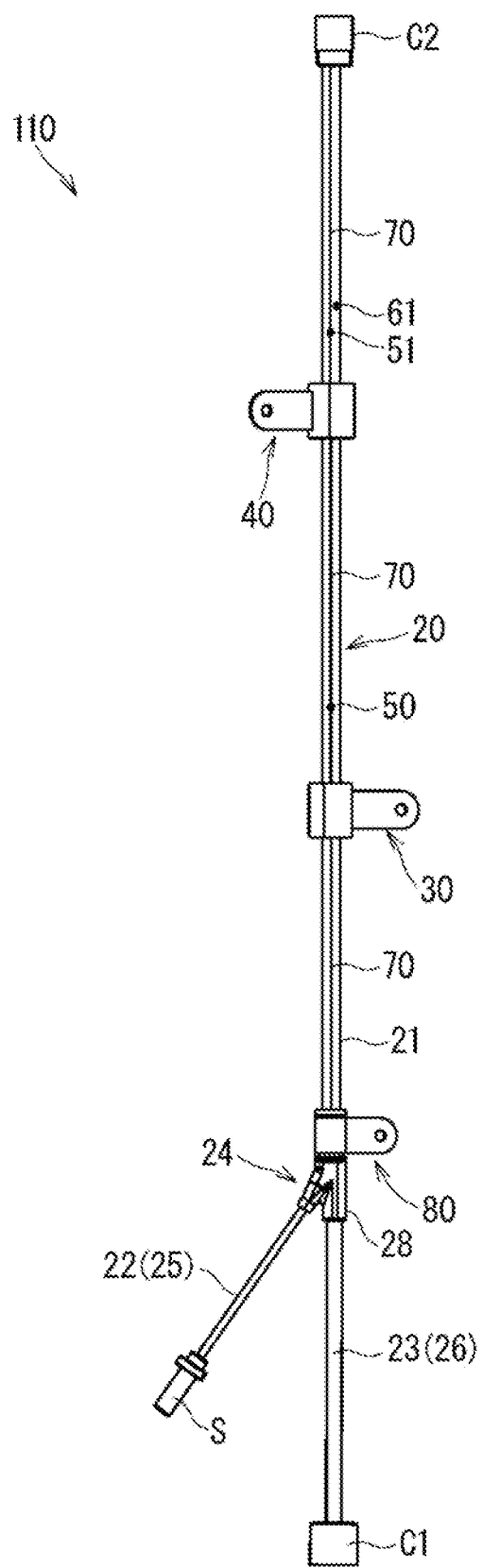
FIG. 6 is a plan view showing a modification of the wire harness according to Embodiment 1.

FIG. 6 is a plan view showing a modification of the wire harness 10 according to Embodiment 1.

A wire harness 110 according to the modification is different from the wire harness 10 described above in that reference line marks 70 are provided on the wiring member 20.

The reference line marks 70 are provided at positions in the same phase as the plurality of first reference marks 50 and 51 so as to extend along the longitudinal direction of the wiring member 20. Since the reference line marks 70 are provided at the positions of the first reference marks 50 and 51, the reference line marks 70 can be easily provided. The reference line marks 70 are provided in order to see the degree of twisting of the wiring member 20 when the wire harness 10 is mounted to a vehicle. That is, the degree of twisting of the wiring member 20 can be checked by checking the degree of bending of the reference line marks 70 when the wire harness 10 is mounted to a vehicle.

The reference line marks 70 may be applied onto the first reference marks 50 and 51, or may be provided avoiding the first reference marks 50 and 51 so as not to be applied onto the first reference marks 50 and 51. The reference line marks 70 may or may not be provided at the positions of the fixing members 30 and 40 and the resin cover portions 33 and 43. The reference line marks 70 are provided in three sections, namely, a section between the branching portion 24 of the main line portion 21 and the fixing member 30, a section between the fixing member 30 and the fixing member 40, and a section between the fixing member 40 and the connector C2. The reference line mark 70 may be provided in only one or two of the above three sections.

The wire harness 110 is different from the wire harness 10 described above also in that a branching-portion fixing member 80 is provided at the position of the branching portion 24, separately from the fixing members 30 and 40. In this case, the first reference marks 50 and 51 and the second reference marks 60 and 61 are not provided at positions corresponding to the branching-portion fixing member 80. The reason for this is that, at the position of the branching portion 24, the reference plane SP can be easily set, and phase management can be easily performed, and it is thus possible to easily set the orientation of the branching-portion fixing member 80 to a predetermined orientation. Since the first reference marks 50 and 51 and the second reference marks 60 and 61 are not provided at the position corresponding to the branching-portion fixing member 80, it is possible to save time and effort required to provide the first reference marks 50 and 51 and the second reference marks 60 and 61. Of course, the first reference marks and the second reference marks may also be provided at positions corresponding to the branching-portion fixing member 80.

Figure 7:
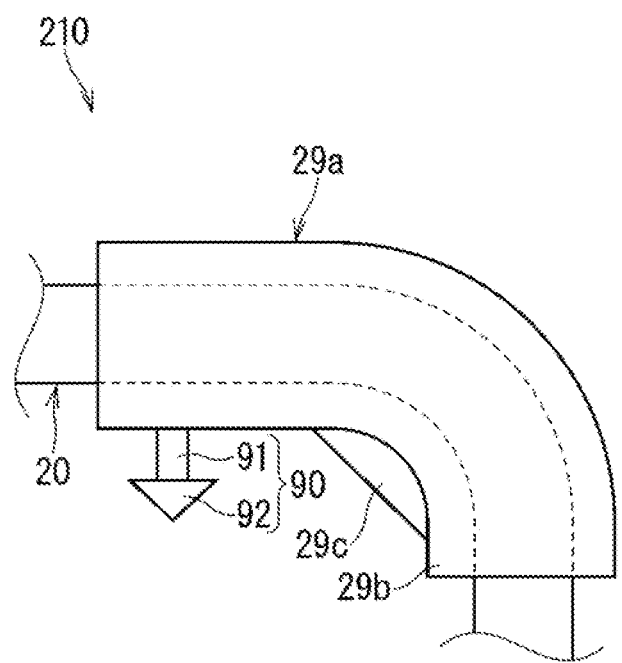
FIG. 7 is a plan view showing another modification of the wire harness according to Embodiment 1.
Figure 8:
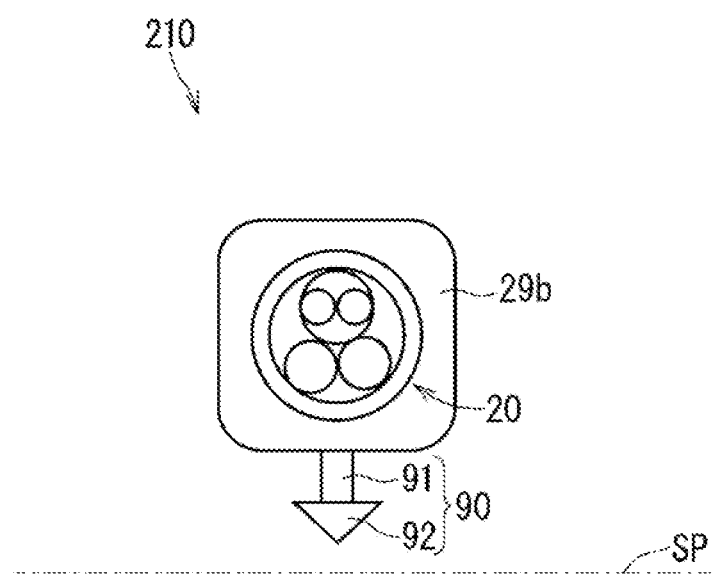
FIG. 8 is a front view showing yet another modification of the wire harness according to Embodiment 1.

FIGS. 7 and 8 are a plan view and a front view, respectively, showing another modification of the wire harness 10 according to Embodiment 1.

Thus far, the reference plane SP has been described as being set based on the branching portion 24. However, this is not an essential configuration. A wire harness 210 according to a modification further includes a clip 90 fixed to the wiring member 20. In the wire harness 210, the reference plane may be set based on the clip 90.

More specifically, the clip 90 is formed so as to be able to be inserted into and locked to a hole formed in an attachment target. The clip 90 includes a column portion 91 and a locking piece 92. The locking piece 92 protrudes laterally from the column portion 91. The locking piece 92 can be elastically deformed such that the width dimension of its wider portion decreases when subjected to a force from a circumferential edge portion of the hole when the clip 90 is inserted into the hole. With this configuration, the clip 90 can pass through the hole. After the clip 90 has passed through the hole, the wider portion of the locking piece 92 catches on the circumferential edge portion of the hole as a result of the locking piece 92 being elastically restored, whereby the clip 90 is locked to the hole. As shown in FIG. 8, in the wire harness 210, a plane orthogonal to the insertion direction of the clip 90 is set as the reference plane SP. In this case as well, the reference plane SP can be easily set. The reference plane SP is parallel to a plane, of an attachment counterpart, in which a hole into which the clip 90 is to be inserted is formed.

Here, the wiring member 20 includes a bent path restriction portion 29a restricted so as to form a path that is planarly bent from a first direction toward a second direction. In the wire harness 210, the reference plane may be set based on the bent path restriction portion 29a. For example, as shown in FIG. 7, the bent path restriction portion 29a may be provided at a portion where all portions of the wiring member 20 are bent while extending in parallel to each other, without being branched. In the example shown in FIG. 7, the bent path restriction portion 29a is formed by providing a path restriction member 29b such as a protector at a portion where all portions of the wiring member 20 are bent while extending parallel to each other. A plane including the first direction and the second direction at the bent path restriction portion 29a is set as the reference plane SP. With this configuration, the reference plane SP can be easily set. In the example shown in FIG. 7, the wiring member 20 is bent from the left-right direction toward the up-down direction of the paper plane of FIG. 7. In this case, the plane parallel to the paper plane of FIG. 7 is set as the reference plane.

At the bent path restriction portion 29a, the wiring member 20 is kept bent by the path restriction member 29b. The path restriction member 29b may be, for example, a resin molded portion insert molded using the wiring member 20 as an insert component. The path restriction member 29b may be a separate molded article molded separately from the wiring member 20.

A bulging portion 29c may be provided at the path restriction member 29b. The bulging portion 29c is provided bulging to the inner circumferential side or the outer circumferential side of the bent portion. The bulging portion 29c is provided so as to couple portions located on opposite sides of the bent portion along the extension direction of the wiring member 20. Providing the bulging portion 29c can increase the rigidity of a portion of the path restriction member 29b that provides path restriction for the bent portion. It is preferable the to provide the bulging portion 29c when the resin that forms the path restriction member 29b is a relatively soft resin, for example.

In the wire harness 210, the clip 90 may be fixed to the path restriction member 29b, for example. When the path restriction member 29b is a resin molded portion, a portion of the clip 90 may be used as an insert component together with the wiring member 20. When the path restriction member 29b is a separate molded article, the clip 90 may be molded in one piece with the path restriction member 29b.

Thus far, the first reference marks 50 and 51 have been described as being provided at a position of an intersection point between a plane passing through the center of the wiring member 20 and parallel or orthogonal to the reference plane SP, and the outer surface of the wiring member 20. However, this is not an essential configuration. For example, the first reference marks 50 and 51 may be provided at a position selected from a plurality of positions displaced at intervals of 30 degrees or 45 degrees from a position of an intersection point between a plane passing through the center of the wiring member 20 and parallel to the reference plane SP, and the outer surface of the wiring member 20.

In addition, thus far, the wiring member 20 has been described as including the first wire 25 for an ABS sensor and the second wire 26 for an EPB. However, this is not an essential configuration. For example, the uses of the first wire 25 and the second wire 26 do not need to be uses for an ABS sensor and an EPB. Although the wiring member 20 has been described as including the sheath 27 that covers the first wire 25 and the second wire 26, this is not an essential configuration. The first wire 25 and the second wire 26 may be covered by a tubular member such as a corrugated tube, instead of being covered by the sheath 27. In this case, it is preferable to provide the first reference marks 50 and 51 and the second reference marks 60 and 61 on the tubular member.

Thus far, the branching portion 24 has been described as being provided on the wiring member 20. However, this is not an essential configuration. The branching portion 24 does not need to be provided on the wiring member 20. Even when the branching portion 24 is provided on the wiring member 20, the configuration of the branching portion 24 is not limited to the configuration described above. For example, two or more branching portions may be provided on the wiring member. For example, three or more branch line portions may be branched from an end portion of the main line portion at one branching portion.

The configurations described in the embodiments and the modifications may be combined as appropriate as long as there are no mutual inconsistencies.

What is claimed is:

1. A wire harness comprising:
a wiring member;
a fixing member provided on the wiring member; and
a first reference mark and a second reference mark that are each provided at a position of the wiring member that corresponds to the fixing member,
wherein the first reference mark and the second reference mark each have a distinctive external appearance in a circumferential direction of the wiring member,
the first reference mark indicates a reference position of the wiring member in the circumferential direction, and
the second reference mark indicates a position of the wiring member in the circumferential direction, the position serving as a reference for an attachment orientation of the fixing member.

2. The wire harness according to claim 1, wherein at least one of the first reference mark and the second reference mark also has a distinctive external appearance in a longitudinal direction of the wiring member.

3. The wire harness according to claim 1, wherein the fixing members are provided at a plurality of positions spaced apart along a longitudinal direction of the wiring member, and
both the first reference mark and the second reference mark are provided at positions respectively corresponding to the plurality of the fixing members.

4. The wire harness according to claim 3, wherein the plurality of the first reference marks are provided at positions in the same phase along the circumferential direction of the wiring member.

5. The wire harness according to claim 4, wherein a reference line mark extending along the longitudinal direction of the wiring member is provided on the wiring member at a position in the same phase as the plurality of the first reference marks.

6. The wire harness according to claim 3, wherein the plurality of the fixing members are attached in the same orientation relative to the respective corresponding second reference marks.

7. The wire harness according to claim 1, wherein a reference plane is set on the wiring member, and
the first reference mark is provided at a position that is based on the reference plane.

8. The wire harness according to claim 7, wherein the wiring member includes a branching portion that branches into two branch line portions from an end portion of a main line portion, and
a plane including an extension direction of the main line portion and extension directions of the two branch line portions at the branching portion is set as the reference plane.

9. The wire harness according to claim 7, further comprising:
a clip fixed to the wiring member,
wherein the clip is formed so as to be able to be inserted into and locked to a hole formed in an attachment target, and
a plane orthogonal to an insertion direction of the clip is set as the reference plane.

10. The wire harness according to claim 7, wherein the wiring member includes a bent path restriction portion restricted so as to form a path that is planarly bent from a first direction toward a second direction, and
a plane including the first direction and the second direction is set as the reference plane.

11. The wire harness according to claim 7, wherein the first reference mark is provided at a position of an intersection point between a plane passing through a center of the wiring member and parallel or orthogonal to the reference plane, and an outer surface of the wiring member.

12. The wire harness according to claim 1, wherein the first reference mark and the second reference mark have colors different from each other.

13. The wire harness according to claim 1, wherein the wiring member includes a first wire for an ABS sensor, a second wire for an EPB, and a sheath provided around the first wire and the second wire, and
the first reference mark and the second reference mark are provided on an outer surface of the sheath.

* * * * *